Sept. 15, 1970   C. W. SCHOLL ET AL   3,528,873
HEAT SEALED PANEL-LIKE ARTICLE
Filed Jan. 4, 1967
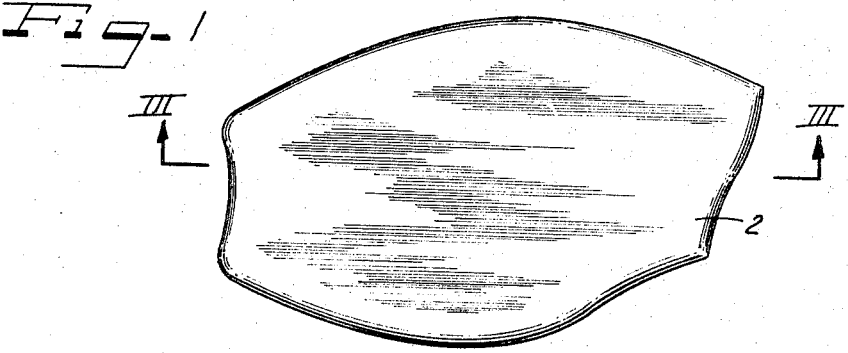
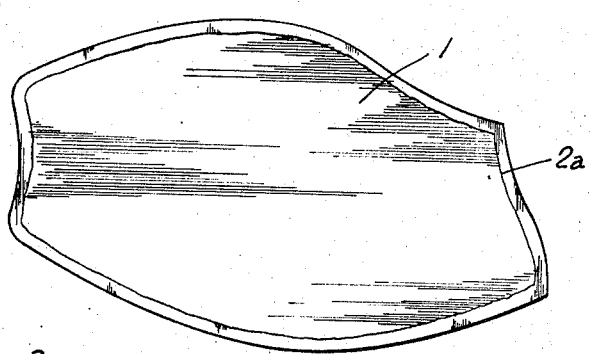
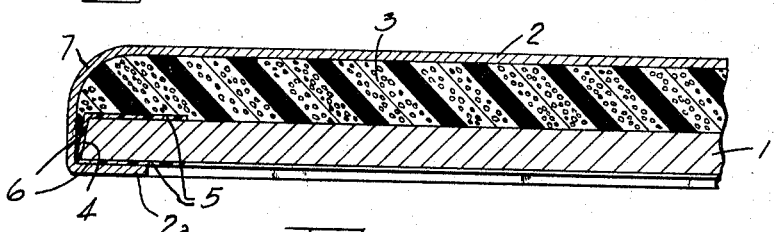
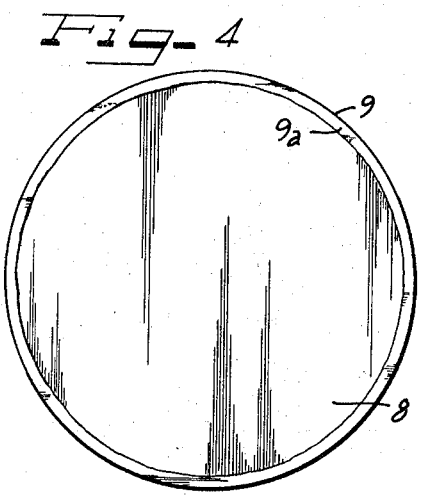
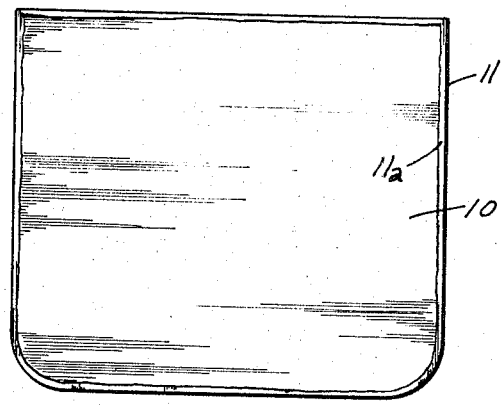
INVENTORS
CARL W. SCHOLL
MILO L. RAFFAELLI, SR.
BY
ATTORNEYS

United States Patent Office 3,528,873
Patented Sept. 15, 1970

3,528,873
HEAT SEALED PANEL-LIKE ARTICLE
Carl W. Scholl and Milo L. Raffaelli, Sr., Chicago, Ill., assignors to The Scholl Mfg. Co., Inc., Chicago, Ill., a corporation of New York
Filed Jan. 4, 1967, Ser. No. 607,249
Int. Cl. B32b 1/04
U.S. Cl. 161—44                    2 Claims

ABSTRACT OF THE DISCLOSURE

This invention or discovery relates to a panel-like article embodying a relatively soft thermoplastic cover electronically heat sealed to a more rigid yet flexible backing member treated with a suitable thermoplastic film to insure a proper heat seal, there being cushioning material between the cover and the backing member, if so desired. The article may be made in various sizes and contours and may be used for numerous purposes. When the article is completed a goodly portion of one face of the backing remains exposed for securement of the article to a surface desired to be covered, by means of adhesive or in any other satisfactory manner.

---

The instant invention is an improvement upon the panel-like structure set forth and claimed in our copending application entitled "Heat Sealed Article With Backing," filed Jan. 4, 1967, Ser. No. 607,246.

BACKGROUND OF THE INVENTION

The instant invention has various uses including but not limited to insoles for footwear, stool and chair seats and backs, furniture panels, wall panels, panels for vehicle interiors and many other uses as will be apparent to one skilled in the art. The cover of the panel-like article is a thermoplastic sheet of attractive appearance and preferably has a soft feel when touched, while the backing member is considerably more rigid than the cover, yet can be made flexible especially when the article is used as an insole, and the front cover effectively protects the backing member over one face thereof, over the bounding edge thereof, and partially over the back, there being in most cases cushioning material between the cover and the covered face of the backing member. The exposed portion of the backing member is applied to a surface to be covered and secured thereto adhesively or by other means.

Heretofore, panel-like articles of this general character have been made but the cover was attached only to the outer face of the backing member leaving exposed the side edge of the backing member. Where the backing member is made of fiberboard impregnated with latex or another suitable medium to render it elastomeric, the edge of the backing member had to be colored in keeping with the color of the cover. Regardless of how carefully this was done it was in most cases impossible to exactly match the cover color and so the edge of the backing member was somewhat visible regardless of the effort to conceal it. Again the edge of the backing member was subject to exposure to moisture notwithstanding being colored such as water, perspiration, etc. and in many cases tended to delaminate and accumulate quantities of dirt not removable. Frequently the backing member was coated with a thin film of vinyl, acetate, or some other substance compatible with electronic heat sealing between it and the cover, and with the cover heat sealed only to the one face of the backing member, the seam had a slight lateral extension thereon which made an unsightly appearance. Also, in some instances it was impossible to install the article with full and complete attachment of the backing member to the surface to be covered and the backing member would remain free from that surface a small fraction of an inch therearound, also resulting in an unsightly appearance and not protecting the rear face of the backing member.

SUMMARY

This invention or discovery embodies a panel-like article embodying a backing member, which preferably has a sloping or bevelled edge, and a cover of thermoplastic material which is electronically heat sealable and which is heat sealed to the backing member which has been given a coating of compatible heat sealable material so that the heat seal seam is effective on the margin of the face of the backing member covered by the cover, the edge of the backing member, and a portion of the opposite face of the backing member. This is accomplished with the use of appropriate dies in a press equipped with ultra high frequency heat sealing means. Thus, the instant invention effectively solves the problems involved in the prior art as above set forth, in that the overall appearance of the article is much more attractive by virtue of the fact there is no unsightly heat seal seam, no portion of the backing member visible, and there is a smooth curvate outline around the article. In addition, the backing member is fully protected from the effects of moisture, even though it is impossible in installation to effectively secure the backing mmeber to the surface to be covered throughout its entire area of the uncovered face because the marginal area not so secured will be completely enclosed by the cover. Also, it is a simple expedient to incorporate cushioning means between the cover and backing member, and such means, if of compatible heat sealable material, will also be embodied at least partially in the heat seal seam. The instant invention, therefore, adds an important advantage to the structure of our aforesaid copending application, since the instant invention causes a heat sealing of the cover over a marginal portion of the uncovered face of the backing member.

FIG. 1 is a plan view of an article embodying principles of the instant invention, illustrating the same in the form of a half insole for an article of footwear;

FIG. 2 is a bottom plan view of the structure of FIG. 1;

FIG. 3 is a greatly enlarged fragmentary vertical sectional view taken substantially as indicated by the line III—III of FIG. 1, looking in the direction of the arrows;

FIG. 4 is a bottom plan view of an article of different shape embodying principles of the instant invention; and FIG. 5 is a bottom plan view of an article of still different shape embodying principles of the instant invention.

The illustrated embodiment of this invention, which is the preferred embodiment, may be made in a number of sizes and contours, as is evinced by the showings in FIGS. 1, 4 and 5, although the general construction of the invention for any size or contour is substantially the same. The invention has numerous uses, as will be apparent to one skilled in the art, including half insoles (FIG. 1) and insoles for articles of footwear, stool or chair seats and backs (exemplified by FIG. 4), vehicle door and interior panels (FIG. 5), furniture and wall panels and paneling, among others.

The first illustrated embodiment of the invention, seen in FIGS. 1 to 3, is in the contour and size of a half insole for articles of footwear such as shoes, sandals, and the like. When used in a sandal this form of the invention will be visible except when covered by the foot of the user, and with a device of the prior art as above discussed, the backing member of the article would have its edge exposed to the adverse effects of moisture such as atmospheric moisture, perspiration, etc., thus resulting in a possible delamination of the backing member and the accumulation of dirt which could not be removed. Such arrangement also necessitates the backing member if the edge is exposed to be colored around the edge in keeping with the color of the cover, which may vary at will. It is virtually impossible in most cases to produce an exact match of color, and therefore the edge of the backing member would be somewhat visible at all times in an unattractive manner. With this invention the coloring operation is completely eliminated, there is a much better appearance, and the color is the same throughout the visible portion because it is only the cover that is visible.

The article embodies a backing member 1 which may be of any desirable material, depending to some extent upon the particular use for which an article is intended. In the case of a half insole for footwear the backing member may be leather, or preferably a fiberboard impregnated with latex or other suitable material to render the same elastomeric so that during use the backing member will not cup, harden, crack or lose its shape. A cover 2 is disposed over one face of the backing member, and this cover is of much more flexible material and of less density than the backing member, an expanded vinyl sheet being highly satisfactory for this purpose. The expanded vinyl, although not essential, other heat sealable plastic sheets being usable, provides a definitely pleasing somewhat grained appearance and affords an exceedingly good feel to the foot of the user. Between the cover and the backing member is a thicker layer 3 of cushioning material, preferably a heat sealable foam material such as vinyl foam, urethane foam, urethane foam impregnated with vinyl, or any other electronically heat sealable foam of satisfactory restorative powers.

In the making of the article, the backing member is preferably precut, and is provided with a sloping or bevelled edge 4, the upper and lower surfaces being parallel. A satisfactory angle of slope for this edge is in the neighborhood of 24° from the vertical, although that exact angle is not essential. The marginal portion of the backing member is then given a thin coating 5, shown greatly exaggerated in FIG. 3, of vinyl cement, liquid vinyl, acetate, or some other compatible heat sealable substance, which may be applied by painting, spraying, dipping, or in some similar manner. From the showing in FIG. 3 it will be seen that the coating 5 extends along the upper face of the backing member, down over the bevel edge 4, and underneath the lower face and, since the coating is dry, no fine degree of accuracy is necessary as to the width of the coating inwardly of the edge of the backing member, since it does not matter if the coating actually extends inwardly beyond the effectual heat seal seam.

The cover 2 and cushion layer 3 may be in the form of a laminate whereby both layers are joined in face-to-face relationship and bonded together by an adhesive or by curing them together at the time of manufacture, or these may be separate sheets and layers not connected until the heat seal seam has been made. Each has its own definite advantage, namely, if a laminate, there is greater ease in handling since both the cover and foam layer may be handled as a single sheet and this is advantageous in the event a large quantity of the same article of the same color has been ordered; while if special orders are given involving small quantities of articles of varying colors, it may be more desirable to keep foam material on hand in only a single color while maintaining the thinner cover sheets in various colors so as to reduce storage space and inventory. In either event the cover 2 and foam layer 3 are preferably stock sheets of indefinite size from which the articles are severed because the ultimate seam is both a heat and tear seal seam and the waste stock is easily removed from around the article.

By the use of appropriate heat sealing dies, a heat seal seam 6 is established which, in the event the foam layer 3 is of heat sealable material, unites the foam layer to the cover layer and to the upper face of the backing member, over the bevelled edge of the backing member, and at least a part of the cover layer will extend or flow during the operation underneath the backing member and be heat sealed to the coating on the underface of the backing member thereby leaving a marginal portion 2a of the cover surrounding the underface of the backing member as seen clearly in FIG. 2. Should there be some excess material not fully heat sealed to the rear face of the backing member this may be easily removed by passing the article over a suitable abrasive surface, leaving the margin 2a fully secured.

The dies utilized for this purpose include an upper die and a lower die both electrically conductive. The upper die has a skirt depending from a base, which skirt is contoured in keeping with the contour of the article being formed, and the skirt terminates in a sharp edge above which is an inner slope that is the counterpart of the sloping edge 4 of the backing member. The lower die is usually a flat plate covered by a suitable dielectric sheet of material to prevent any portion of the melted thermoplastic from sticking to the face of the die. To acquire the instant invention the lower die, however, is provided with a pedestal also contoured in keeping with the contour of the article being made and this pedestal is centrally secured to the flat lower die. In the even the article is round the dielectric extends beneath the pedestal to the bolt or equivalent element which secures the pedestal to the lower die. In the event the article is of irregular contour as seen in FIGS. 1 to 3 inclusive, the pedestal has a marginal undercut and the dielectric extends only to the inner edge defining the undercut. Thus, the distance the ultra high frequency current must travel to reach the lower die remains the same, and some of the melted cover material will flow inwardly beneath the backing member above the pedestal, providing the marginal cover portion 2a on the underside of the backing member.

When the heat seal seam is completed, it will be noted that the upper face, edge, and a marginal portion of the lower face of the backing member 1 are completely encased by at least the cover element 2, although the foam layer 3 may be throughout a part of the heat seal seam at the edge of the backing member. It will be noted that there is a smooth and pleasing curvature 7 of the cover 2 around and under the backing member with no interruption in the smooth contour of the cover where it is joined to the backing member. This not only adds greatly to the resulting beauty of the article but also affords complete protection for the backing member. For example, should the usual shallow concavity in the outer sole or mid-sole of a shoe result in an operator not securing the entire rear face of the half insole in postion but leave a marginal portion thereof free for a fraction of an inch inwardly the appearance would be virtually the same as though the half insole were completely secured, and the backing member would still be effectively protected against moisture. The width of the margin 2a of the cover on the underside of the backing member is amply sufficient to permit adequate securement of the entire uncovered portion of the underface of the backing member.

In FIG. 4, we have illustrated the article having a round contour, the illustration being greatly reduced, and the article may effectively be utilized as a stool or chair seat or back. In this instance a backing member 8, which may be of the fiberboard as described above, plywood, or any other suitable substance, is covered over one face by a cover 9 of the same material as the cover 2 above described and a marginal portion 9a around the underface of the backing member is provided in the same manner as above described. Cushioning means may be employed between the cover and the backing member and, except for contour and size, the article of FIG. 4 is manufactured the same as the article of FIGS. 1 to 3 inclusive. The cushioning material employed may be given any desired thickness in accord with the intended usage.

To further illustrate the versatility of the instant invention we have shown a panel in FIG. 5 embodying a backing member 10 made of any suitable material, covered over one face by a cover 11 of the material above described, and there is a marginal portion 11a of the cover material extending over the under or uncovered face of the backing member. The article of FIG. 5 is generally rectangular with curvate lower corners, is made the same way as the article of FIGS. 1 to 3, inclusive, and is highly desirable for use as a padded panel in the interior of a vehicle such as an automobile.

From the foregoing, it will be apparent, especially to one skilled in the art, that the instant invention possesses advantages not obtainable heretofore, and may be made in various sizes and contours for usage in numerous ways.

It will be understood that modifications and variations may be effected without departing from the scope of the novel concepts of the present invention.

We claim as our invention:

1. A panel-like article comprising a backing member carrying a marginal stripe of heat-sealable material thereon, said marginal stripe extending over the side edge of said backing member and also along the margin of one face of said backing member, thermoplastic cover material overlying the opposite face of said backing member and a layer of foam cushioning material between said backing member and said cover material, wherein the side edge of said backing member is bevelled outwardly from said covered face to said one face, and said foam material extends slightly beyond said bevelled edge but does not extend around said edge to said one face, and said cover material extends around said entire side edge and is heat-sealed to the margin of said one face and side edge, the entire area of said cover including that portion sealed to the margin of said one face having a smooth uninterrupted surface.

2. The article in accordance with claim 1 in which the cover material is electronically heat sealable material and is electronically heated and flow sealed to the margin of said one face and side edge.

References Cited

UNITED STATES PATENTS

| | | | |
|---|---|---|---|
| 2,478,121 | 8/1949 | Morner | 156—216 |
| 2,606,598 | 8/1952 | Smith | 297—461 |
| 2,699,416 | 1/1955 | Lyijynen et al. | 161—43 |
| 2,705,522 | 4/1955 | Kamborian | 156—216 |
| 3,075,862 | 1/1963 | Hoyer | 161—43 |

DOUGLAS T. DRUMMOND, Primary Examiner

U.S. Cl. X.R.

161—149, 161; 156—216, 273